(12) United States Patent
Mochizuki et al.

(10) Patent No.: US 10,720,871 B2
(45) Date of Patent: Jul. 21, 2020

(54) DRIVING CIRCUIT AND MOTOR

(71) Applicant: Nidec Corporation, Kyoto (JP)

(72) Inventors: Ryogo Mochizuki, Kyoto (JP); Kazuya Matsuzaki, Kyoto (JP); Kazumasa Ue, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 16/145,246

(22) Filed: Sep. 28, 2018

(65) Prior Publication Data

US 2019/0131908 A1    May 2, 2019

(30) Foreign Application Priority Data

Oct. 30, 2017   (JP) ................ 2017-209501

(51) Int. Cl.
*H02K 29/08* (2006.01)
*H02P 27/04* (2016.01)
*H02P 25/03* (2016.01)
*G01D 5/14* (2006.01)
*H02P 6/16* (2016.01)

(52) U.S. Cl.
CPC ............ *H02P 27/04* (2013.01); *G01D 5/145* (2013.01); *H02P 6/16* (2013.01); *H02P 25/03* (2016.02)

(58) Field of Classification Search
CPC ............ H02P 6/16; H02P 27/04; H02P 25/03
See application file for complete search history.

(56) References Cited

U.S. PATENT DOCUMENTS

| 4,022,980 A * | 5/1977 | Kitajewski ......... H04M 3/2272 |
| | | 379/252 |
| 2014/0159756 A1* | 6/2014 | Ueno .................. G01R 15/202 |
| | | 324/750.01 |

FOREIGN PATENT DOCUMENTS

| JP | 5-75686 U | 10/1993 |
| JP | 6-186253 A | 7/1994 |
| JP | 7-38171 A | 2/1995 |
| JP | 10-178794 A | 6/1998 |
| JP | 2005-265751 A | 9/2005 |

* cited by examiner

*Primary Examiner* — Karen Masih
(74) *Attorney, Agent, or Firm* — Keating & Bennett

(57) ABSTRACT

A driving circuit that drives a Hall element for use in a brushless DC motor includes a reference-voltage generator that generates a reference voltage, an operational amplifier to which the reference voltage is input, and a resistance. One of input terminals and GND terminals of all of one or more Hall elements included in the driving circuit are connected to an output end of the operational amplifier. Predetermined potential is applied to the other of the input terminals and the GND terminals of all of the one or more Hall elements. The one or more Hall elements and the resistance are connected in series between a first power supply voltage and ground potential.

12 Claims, 4 Drawing Sheets

DRIVING CIRCUIT AND MOTOR

CROSS REFERENCE TO RELATED APPLICATIONS

This application claims the benefit of priority to Japanese Patent Application No. 2017-209501 filed on Oct. 30, 2017. The entire contents of this application are hereby incorporated herein by reference.

BACKGROUND OF THE INVENTION

1. Field of the Invention

The present disclosure relates to a driving circuit that drives a Hall element.

2. Description of the Related Art

Conventionally, a Hall element is sometimes disposed in a brushless DC motor in order to detect a rotating position of a rotor. The Hall element is a sensor of a noncontact type that converts a magnetic field into an electric signal making use of a Hall effect and outputs the electric signal.

FIG. 4 is a circuit diagram showing a conventional example of a configuration for driving a Hall element. In the configuration shown in FIG. 4, a plurality of Hall elements connected in parallel are driven. More specifically, three Hall elements H1, H2, and H3 are connected in parallel. The other end of a resistor Rs1, to one end of which a power supply voltage Vc is applied, is connected to input ends of the Hall elements H1, H2, and H3. GND terminals (ground terminals) of the Hall elements H1, H2, and H3 are connected to one end of a resistor Rs2. Ground potential is applied to the other end of the resistor Rs2.

The internal resistance of the Hall element changes according to a change in an environmental temperature. In the configuration shown in FIG. 4, when the internal resistance of each of the Hall elements H1, H2, and H3 changes according to the change in the environmental temperature, because a division ratio by the resistors Rs1 and Rs2 and the Hall elements changes, voltages applied to the Hall elements H1, H2, and H3 change. Consequently, output signals of the Hall elements H1, H2, and H3 change. In particular, in an environment in which a temperature change is large, the change in the output signals of the Hall elements H1, H2, and H3 sometimes increases.

SUMMARY OF THE INVENTION

A driving circuit in an illustrative embodiment of the present disclosure is a driving circuit that drives a Hall element for use in a brushless DC motor, the driving circuit including a reference-voltage generator that generates a reference voltage; an operational amplifier to which the reference voltage is input; and a resistance. One of input terminals and GND terminals of all of one or more Hall elements included in the driving circuit, are connected to an output end of the operational amplifier. Predetermined potential is applied to another of the input terminals and the GND terminals of all of the one or more the Hall elements. The one or more Hall elements and the resistance are connected in series between a first power supply voltage and ground potential.

The above and other elements, features, steps, characteristics and advantages of the present disclosure will become more apparent from the following detailed description of the preferred embodiments with reference to the attached drawings.

DETAILED DESCRIPTION OF THE PREFERRED EMBODIMENTS

An illustrative embodiment of the present disclosure is explained below with reference to the drawings.

Figure 1:
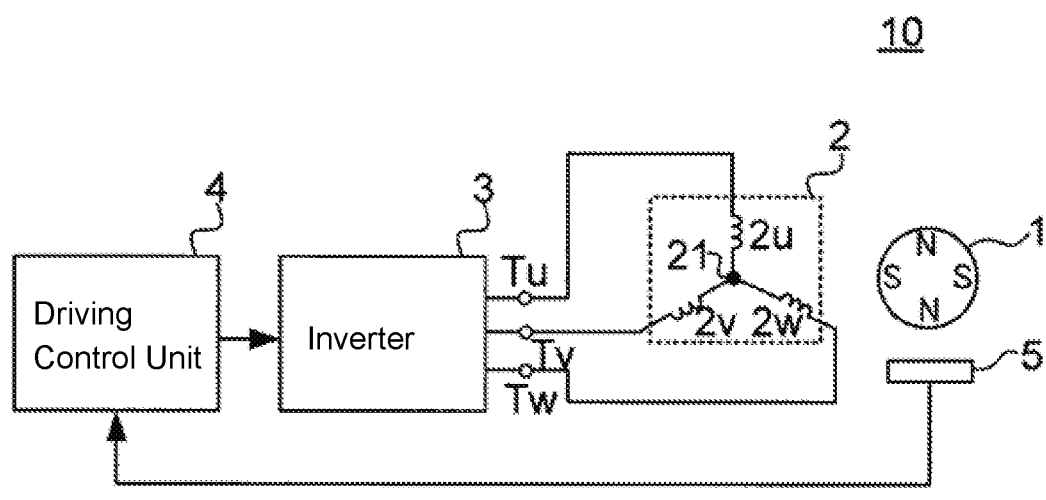
FIG. 1 is a schematic diagram showing a configuration of a brushless DC motor of an illustrative embodiment of the present disclosure.

FIG. 1 is a schematic diagram showing the configuration of an illustrative brushless DC motor (BLDC motor) 10 of the present disclosure. The BLDC motor 10 is a three-phase motor and includes a rotor 1, a stator 2, an inverter 3, a driving control unit 4, and a Hall element circuit 5.

The rotor 1 includes a permanent magnet. The stator 2 includes a U-phase winding 2u, a V-phase winding 2v, and a W-phase winding 2w. The U-phase winding 2u, the V-phase winding 2v, and the W-phase winding 2w are Y-connected centering on a neutral point 21. Unconnected ends on the opposite side of the neutral point 21 in the U-phase winding 2u, the V-phase winding 2v, and the W-phase winding 2w are respectively connected to terminals Tu, Tv, and Tw.

The inverter 3 includes an inverter circuit for a U phase, an inverter circuit for a V phase, and an inverter circuit for a W phase not shown in FIG. 1. The inverter circuits include pairs of switching elements. The pairs of switching elements are connected in series between a DC power supply and the ground. The switching elements are configured by MOSFETs (field effect transistors), IGBTs (insulated gate bipolar transistors), and the like.

The pairs of switching elements in the inverter circuits include switching elements on a high-voltage side and switching elements on a low-voltage side. The terminals Tu, Tv, and Tw are respectively connected to connection nodes between the switching elements.

The Hall element circuit 5 includes a not-shown Hall element as explained in detail below. The Hall element circuit 5 outputs an electric signal corresponding to a magnetic field change due to rotation of the rotor 1. The driving control unit 4 detects a rotating position of the rotor 1 based on the electric signal output from the Hall element circuit 5.

The driving control unit 4 performs, for example, vector control. In this case, the driving control unit 4 generates, based on a q-axis current command value, a d-axis current command value, and a rotating position detection result of the rotor 1, an input signal input to the inverter 3.

In the inverter 3, the switching elements are driven to be switched based on the input signal. Consequently, in the inverter 3, a DC voltage is converted into a three-phase AC voltage and output from the terminals Tu, Tv, and Tw. The three-phase AC voltage is applied to the stator 2, whereby electric currents corresponding to the three-phase AC voltage flow to the U-phase winding 2u, the V-phase winding 2v, and the W-phase winding 2w and the BLDC motor 10 is driven.

Figure 2:
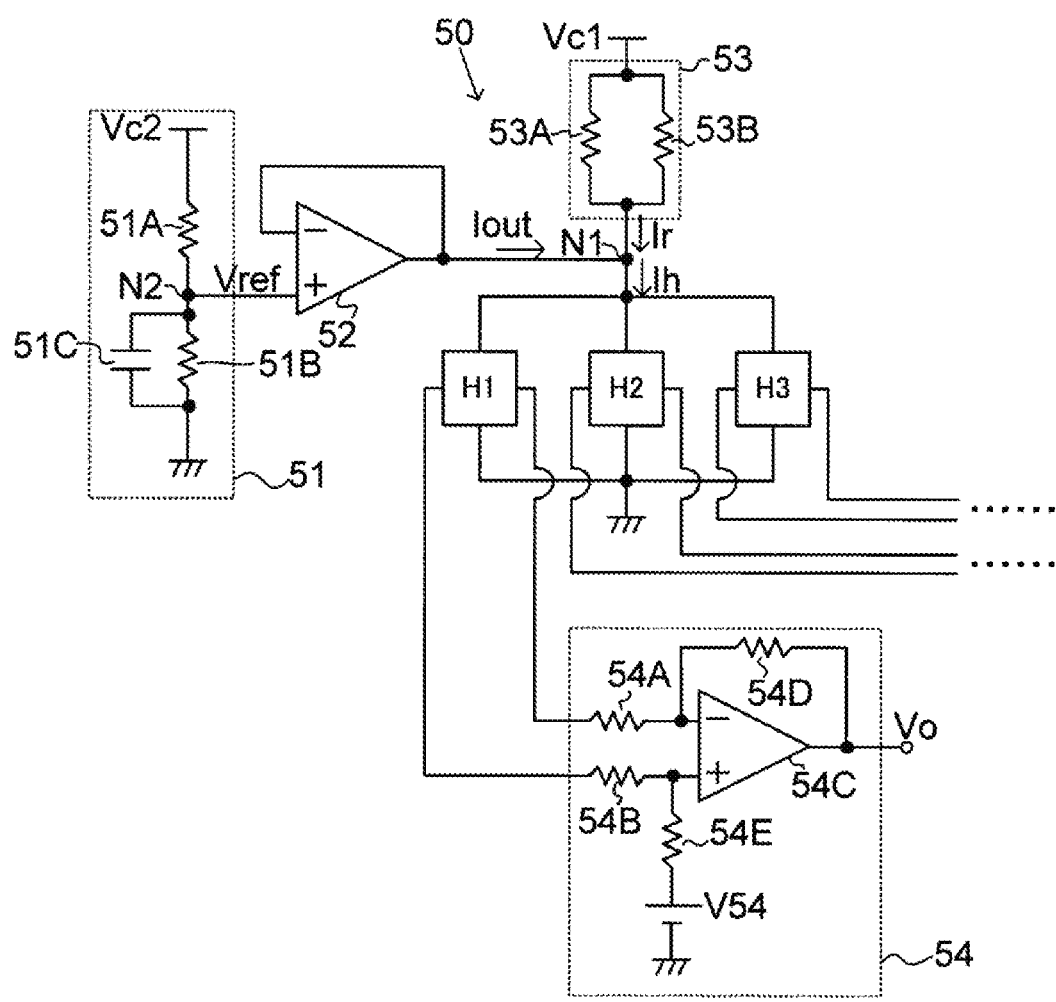
FIG. 2 is a circuit diagram showing a configuration example of a Hall element circuit of an illustrative embodiment of the present disclosure.

The configuration of the Hall element circuit 5 is explained. FIG. 2 is a circuit diagram showing a configuration example of the Hall element circuit 5. As shown in FIG. 2, the Hall element circuit 5 includes a plurality of Hall elements H1, H2, and H3, a driving circuit 50 that drives the Hall elements H1, H2, and H3, and a differential amplifier unit 54.

The Hall elements H1, H2, and H3 are disposed at equal intervals in a circumferential direction around the rotor 1 (FIG. 1). Note that the circumferential direction is a direction around a rotation axis of the rotor 1. The Hall elements H1, H2, and H3 respectively convert a magnetic field generated by a magnetic pole of the rotor 1 into an electric signal making use of the Hall effect and output the electric signal. Note that the number of Hall elements may be plural other than three according to a type of a motor.

The driving circuit 50 includes a reference-voltage generator 51, an operational amplifier 52, and a resistance 53.

The reference-voltage generator 51 includes a first resistor 51A, a second resistor 51B, and a capacitor 51C. A second power supply voltage Vc2 is applied to one end of the first resistor 51A. One end of the second resistor 51B is connected to the other end of the first resistor 51A. Ground potential is applied to the other end of the second resistor 51B. That is, the first resistor 51A and the second resistor 51B are connected in series between the second power supply voltage Vc2 and the ground potential.

The second power supply voltage Vc2 is divided by the first resistor 51A and the second resistor 51B, whereby a reference voltage Vref is generated in a connection node N2 to which the first resistor 51A and the second resistor 51B are connected. Note that, for measures against noise, the capacitor 51C is connected between both ends of the second resistor 51B.

A plus input terminal (a non-inverting input terminal) of the operational amplifier 52 is connected to the connection node N2. That is, the reference voltage Vref is applied to the plus input terminal. An output terminal of the operational amplifier 52 is connected to a negative input terminal (an inverting input terminal) of the operational amplifier 52. A voltage follower circuit is configured by such an operational amplifier 52.

The resistance 53 includes a plurality of resistors 53A and 53B. The resistors 53A and 53B are connected in parallel. A first power supply voltage Vc1 is applied to one ends of the resistors 53A and 53B. The other ends of the resistors 53A and 53B are connected to the output terminal of the operational amplifier 52 in a connection node N1.

The Hall elements H1, H2, and H3 are connected in parallel. Input terminals of the Hall elements H1, H2, and H3 are connected to the connection node N1. The ground potential is applied to GND terminals (ground terminals) of the Hall elements H1, H2, and H3. That is, the resistance 53 and the Hall elements H1, H2, and H3 are connected in series between the first power supply voltage Vc1 and the ground potential.

In each of the Hall elements H1, H2, and H3, a voltage is applied between the input terminal and the GND terminal. Therefore, the Hall elements H1, H2, and H3 output electric signals corresponding to a magnetic field from output terminals. The output terminals of the Hall elements H1, H2, and H3 are connected to input ends of differential amplifier units. Note that, in FIG. 2, for convenience, the configuration of only the differential amplifier unit 54 corresponding to the Hall element H1 is shown. However, the configuration of not-shown differential amplifier units corresponding to the Hall elements H2 and H3 is the same as the configuration of the differential amplifier unit 54.

The differential amplifier unit 54 includes a resistor 54A, a resistor 54B, an operational amplifier 54C, a resistor 54D, and a resistor 54E. One end of the resistor 54A is connected to one output terminal of the Hall element H1. One end of the resistor 54B is connected to the other output terminal of the Hall element H1. The other end of the resistor 54A is connected to a negative input terminal of the operational amplifier 54C. The other end of the resistor 54B is connected to a plus input terminal of the operational amplifier 54C. The negative input terminal of the operational amplifier 54C is connected to an output terminal of the operational amplifier 54C via the resistor 54D. The plus input terminal of the operational amplifier 54C is connected to one end of the resistor 54E. A predetermined voltage V54 is applied to the other end of the resistor 54E.

The differential amplifier unit 54 amplifies an electric signal output from the output terminal of the Hall element H1 and outputs the electric signal as an output voltage Vo. The output voltage Vo output from the differential amplifier units corresponding to the Hall elements H1, H2, and H3 becomes an output of the Hall element circuit 5.

The operation of the driving circuit 50 is explained. Internal resistances of the Hall elements H1, H2, and H3 change according to a change in an environmental temperature. In general, the internal resistance of a Hall element decreases as temperature is higher.

In FIG. 2, an electric current flowing from the connection node N1 to the Hall elements H1, H2, and H3 side is shown as an electric current Ih. That is, the electric current Ih is an electric current flowing in the Hall elements H1, H2, and H3. An electric current flowing from the resistance 53 to the connection node N1 side is shown as an electric current Ir. That is, the electric current Ir is an electric current flowing in the resistance 53. An output current of the operational amplifier 52 is shown as an electric current Iout. The electric current Iout is discharged from the operational amplifier 52 in some cases and is absorbed into the operational amplifier 52 in other cases.

When the internal resistances of the Hall elements H1, H2, and H3 change according to the change in the environmental temperature, the electric current Ih necessary for setting a voltage in the connection node N1 to the reference voltage Vref changes. Because there is a relation Ih=Iout+Ir, the operational amplifier 52 changes the output current Iout according to the change in the electric current Ih and according to the electric current Ir. Consequently, the voltage in the connection node N1 is constantly controlled to the reference voltage Vref irrespective of a temperature change. Because the Hall elements H1, H2, and H3 are connected in parallel, voltages applied to the Hall elements H1, H2, and H3 are uniformly set to the reference voltage Vref.

Therefore, the Hall elements H1, H2, and H3 are driven at a constant voltage irrespective of the temperature change. Consequently, a change in electric signals output from the Hall elements H1, H2, and H3 due to the temperature change is prevented. When the rotor 1 rotates, the output voltage Vo after amplification temporally changes and has amplitude. A change in the amplitude of the output voltage Vo due to the temperature change is prevented.

For example, as the environmental temperature rises to 0° C., 25° C., 70° C., and 100° C., the electric current Ih necessary for setting the voltage in the connection node N1 to the reference voltage Vref increases. Consequently, for example, the output current Iout is absorbed into the operational amplifier 52 at 0° C., 25° C., and 70° C. and is discharged from the operational amplifier 52 at 100° C.

When temperature is high, because the electric current Ih increases, if the resistance 53 is not provided, it is necessary to increase the output current Iout discharged from the operational amplifier 52. A high current supply ability of the operational amplifier 52 is necessary. However, in this embodiment, because the resistance 53 is provided to supply the electric current Ir, the discharged output current Iout may be small. It is possible to reduce the current supply ability of the operational amplifier 52 and reduce cost of the operational amplifier 52.

As explained above, the driving circuit 50 of this embodiment is the driving circuit that drives the Hall elements H1, H2, and H3 used in the BLDC motor 10. The driving circuit 50 includes the reference-voltage generator 51 that generates the reference voltage Vref, the operational amplifier 52 to which the reference voltage is input, and the resistance 53. Input terminals of all of one or more provided Hall elements H1, H2, and H3 are connected to an output end of the operational amplifier. Predetermined potential (ground potential) is applied to the other of the GND terminal of all the Hall elements. The Hall elements H1, H2, and H3 and the resistance 53 are connected in series between the first power supply voltage Vc1 and the ground potential.

Consequently, even if the internal resistance of the Hall element changes according to a change in temperature, the operational amplifier controls an output current according to the change in the internal resistance, whereby an output voltage of the operational amplifier is controlled to the reference voltage. Therefore, an input voltage applied to the Hall element is controlled to be constant. Therefore, a change in an output signal of the Hall element due to the temperature change can be prevented. Because a current supply ability of the operational amplifier can be reduced, cost of the operational amplifier can be reduced. That is, a cost reduction of the driving circuit 50 can be achieved.

The first power supply voltage Vc1 is applied to one end of the resistance 53. The input terminal is connected to the other end of the resistance. The ground potential is applied to the GND terminal.

Consequently, according to a relation between an electric current fed to the Hall element necessary for setting the output voltage of the operational amplifier to the reference voltage and an electric current flowing in the resistance, an electric current is discharged from the operational amplifier or absorbed into the operational amplifier. Consequently, a constant voltage of the reference voltage is applied to the Hall element irrespective of a temperature change.

The output terminal of the operational amplifier and the negative input terminal of the operational amplifier are connected. Consequently, a voltage follower circuit is configured. The output voltage of the operational amplifier is controlled to the reference voltage.

The resistance includes a plurality of resistors connected in parallel. Consequently, because an inexpensive resistor such as a chip resistor can be used, cost can be reduced. Even if the number of Hall elements increases, it is easy to cope with the increase in the number of Hall elements by adjusting the number of resistors.

The reference-voltage generator 51 includes the first resistor 51A and the second resistor 51B. The second power supply voltage Vc2 is applied to one end of the first resistor 51A. One end of the second resistor 51B is connected to the other end of the first resistor 51A. The ground potential is applied to the other end of the second resistor 51B. The reference voltage Vref is generated in the connection node N2 to which the first resistor 51A and the second resistor 51B are connected.

Consequently, the reference voltage can be generated by the division of the second power supply voltage by the first resistor 51A and the second resistor 51B.

The first resistor 51A and the second resistor 51B desirably have the same correlation with respect to a temperature change. Further, the first resistor 51A and the second resistor 51B desirably have the same temperature coefficient of resistance. Consequently, the reference voltage Vref is less easily affected by the temperature change.

The capacitor 51C is connected between both the ends of the second resistor 51B. Note that a capacitor may be connected between both the ends of the first resistor 51A. Consequently, the reference voltage Vref is less easily affected by noise from the outside and is stabilized.

The Hall elements H1, H2, and H3 are provided in plurality. Consequently, the Hall elements are connected in parallel. Even if variation of temperature/resistance characteristics occurs in the Hall elements, a uniform voltage can be applied to the Hall elements. Therefore, variation of output signals of the Hall elements can be prevented.

The BLDC motor 10 of this embodiment includes the driving circuit 50 and the Hall elements H1, H2, and H3. Consequently, a change in output signals of the Hall elements with respect to a temperature change can be prevented. A cost reduction of the driving circuit 50 can be achieved.

Figure 3:
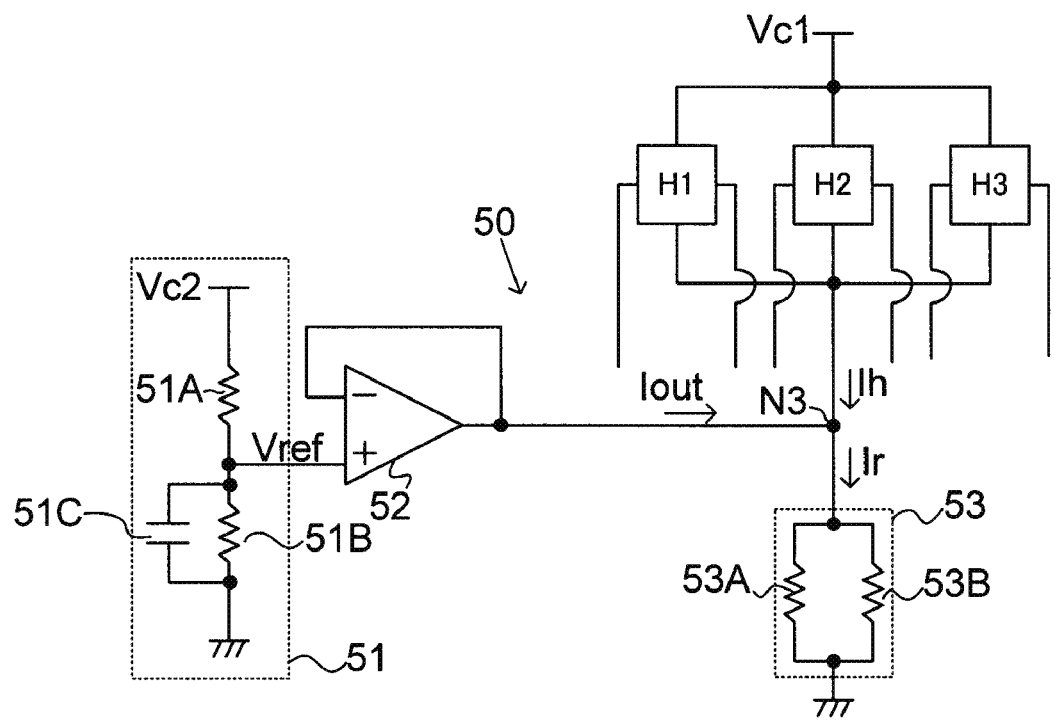
FIG. 3 is a circuit diagram showing a configuration according to a modification of a Hall element circuit of an illustrative embodiment of the present disclosure.
Figure 4:
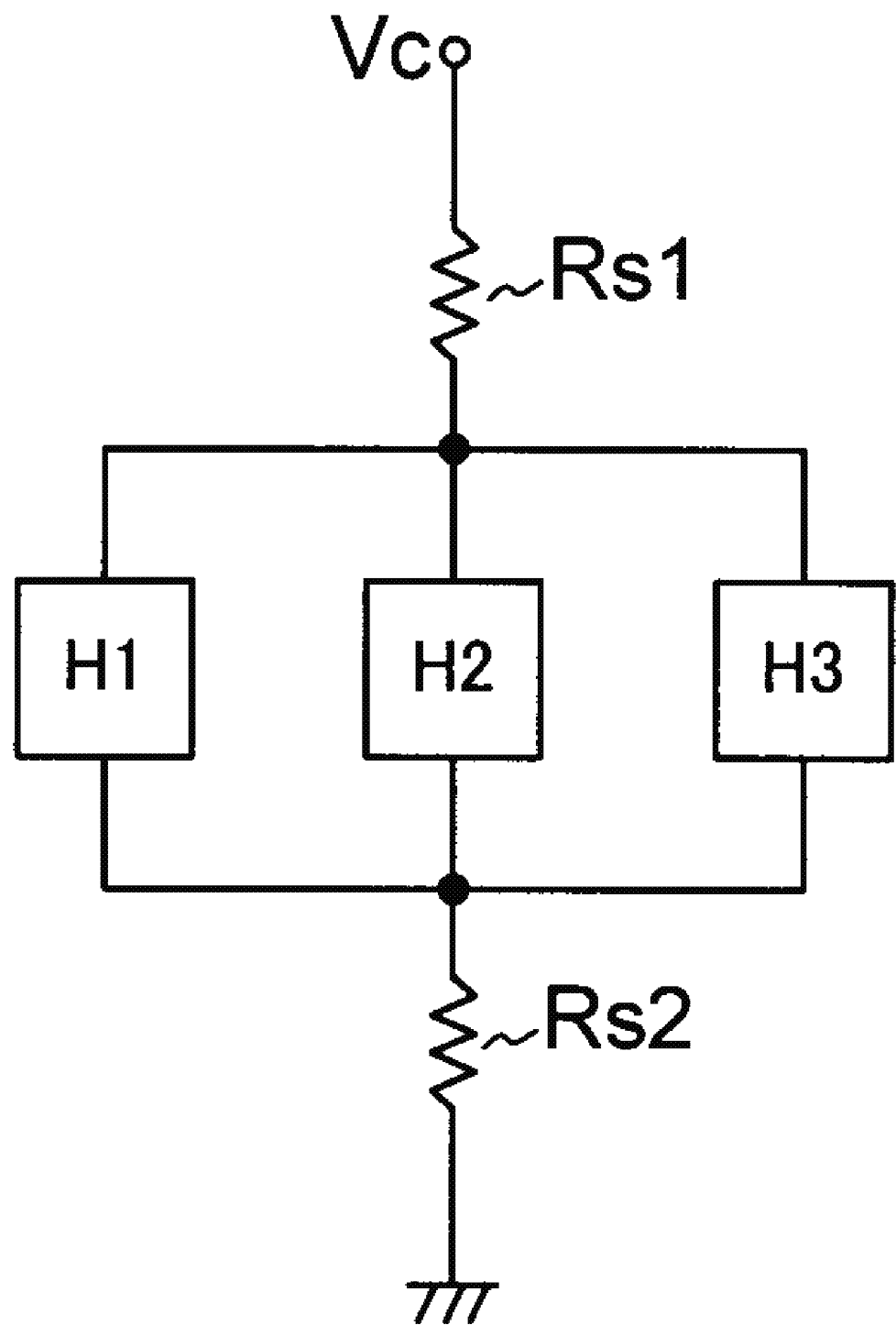
FIG. 4 is a circuit diagram showing a conventional example of a configuration for driving a Hall element.

A modification of the Hall element circuit 5 is explained. FIG. 3 is a circuit diagram showing a configuration according to the modification of the Hall element circuit 5. The driving circuit 50 in the Hall element circuit 5 shown in FIG. 3 drives the Hall element circuits H1, H2, and H3. The Hall elements H1, H2, and H3 are connected in parallel.

Differences of the driving circuit 50 shown in FIG. 3 from the configuration shown in FIG. 2 are as explained below. The first power supply voltage Vc1 is applied to the input terminals of the Hall elements H1, H2, and H3. The GND terminals of the Hall elements H1, H2, and H3 are connected to the output terminal of the operational amplifier 52 in a connection node N3. One end of the resistance 53 is connected to the connection node N3. The ground potential is applied to the other end of the resistance 53. Note that, although not shown in FIG. 3, differential amplifier units are respectively connected to the output terminals of the Hall elements H1, H2, and H3.

In FIG. 3, an electric current flowing from the Hall elements H1, H2, and H3 to the connection node N3 side is shown as the electric current Ih. That is, the electric current Ih is an electric current flowing to the Hall elements H1, H2, and H3. An electric current flowing from the connection node N3 to the resistance 53 side is shown as the electric current Ir. That is, the electric current Ir is an electric current flowing in the resistance 53. An output current of the operational amplifier 52 is shown as the electric current Iout. A relation of Ir=Iout+Ih holds.

When the internal resistances of the Hall elements H1, H2, and H3 change according to a change in an environmental temperature, the electric current Ih necessary for setting a voltage in the connection node N3 to the reference voltage Vref changes. The operational amplifier 52 changes the output current Iout according to the change in the electric current Ih and according to the electric current Ir. The output current Iout is discharged from the operational amplifier 52 in some cases and absorbed into the operational amplifier 52 in other cases. Consequently, the voltage in the connection node N3 is constantly controlled to the reference voltage Vref irrespective of the temperature change. Because the Hall elements H1, H2, and H3 are connected in parallel, voltages applied to the Hall elements H1, H2, and H3 are uniform at a differential voltage between the first power supply voltage Vc1 and the reference voltage Vref.

Therefore, the Hall elements H1, H2, and H3 are driven at a constant voltage irrespective of the temperature change. Consequently, a change in electric signals output from the Hall elements H1, H2, and H3 due to the temperature change is prevented. The current supply ability of the operational amplifier 52 can be reduced by the supply of the electric current Ih. Therefore, a cost reduction of the operational amplifier 52 can be achieved.

As explained above, the driving circuit 50 according to this embodiment is the driving circuit that drives the Hall elements H1, H2, and H3 used in the BLDC motor 10. The driving circuit 50 includes the reference-voltage generator 51 that generates the reference voltage Vref, the operational amplifier 52 to which the reference voltage is input, and the resistance 53. The GND terminals of all of the one or more provided Hall elements H1, H2, and H3 are connected to the output end of the operational amplifier. The predetermined potential Vc1 is applied to the input terminals of all the Hall elements. The Hall elements and the resistance are connected in series between the first power supply voltage Vc1 and the ground potential.

The first power supply voltage Vc1 is applied to the input terminals. The GND terminals are connected to one end of the resistance 53. The ground potential is applied to the other end of the resistance.

Consequently, discharge of an electric current from the operational amplifier or absorption of an electric current into the operational amplifier is performed according to a relation between an electric current fed to the Hall elements necessary for setting the output voltage of the operational amplifier to the reference voltage and an electric current flowing in the resistance. Consequently, a constant voltage of a difference between the first power supply voltage and the reference voltage is applied to the Hall elements.

The embodiment of the present disclosure is explained above. However, various changes of the embodiment are possible within the scope of the spirit of the present disclosure.

The present disclosure can be used for, for example, driving of a Hall element included in a brushless DC motor.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A driving circuit for use in a brushless DC motor, the driving circuit comprising:
    one or more Hall elements;
    a reference-voltage generator that generates a reference voltage;
    an operational amplifier to which the reference voltage is input; and
    a resistance; wherein
    one of input terminals and ground (GND) terminals of all of the one or more Hall elements are directly electrically connected to an output of the operational amplifier;
    the one or more Hall elements and the resistance are connected in series between a first power supply voltage and a ground potential; and
    one of the following is true;
        the inner terminals of the one or more Hall elements are directly electrically connected to the output of the operational amplifier and the ground potential is applied to the GND terminals of all of the one or more Hall elements; or
        the GND terminals of all of the one or more Hall elements are directly electrically connected to the output of the operational amplifier and the first power supply voltage is applied to the input terminals of all of the one or more Hall elements.

2. The driving circuit according to claim 1, wherein
    the first power supply voltage is applied to one end of the resistance; and
    the input terminal is connected to another end of the resistance.

3. The driving circuit according to claim 1, wherein
    the GND terminals are connected to one end of the resistance; and
    the ground potential is applied to another end of the resistance.

4. The driving circuit according to claim 1, wherein an output terminal of the operational amplifier and a negative input terminal of the operational amplifier are directly electrically connected.

5. The driving circuit according to claim 1, wherein the resistance includes a plurality of resistors connected in parallel.

6. The driving circuit according to claim 1, wherein
    the reference-voltage generator includes a first resistor and a second resistor;
    a second power supply voltage is applied to one end of the first resistor;
    one end of the second resistor is connected to another end of the first resistor;
    the ground potential is applied to another end of the second resistor; and
    the reference voltage is generated in a connection node to which the first resistor and the second resistor are connected.

7. The driving circuit according to claim 6, wherein the first resistor and the second resistor have a same correlation with respect to a temperature change.

8. The driving circuit according to claim 7, wherein the first resistor and the second resistor have a same temperature coefficient of resistance.

9. The driving circuit according to claim 6, wherein a capacitor is connected between both ends of the first resistor.

10. The driving circuit according to claim 6, wherein a capacitor is connected between both ends of the second resistor.

11. The driving circuit according to claim 1, wherein the one or more elements includes a plurality of the Hall elements.

12. A motor comprising:
    the driving circuit according to claim 1.

* * * * *